US010899915B2

(12) United States Patent
Han (10) Patent No.: US 10,899,915 B2
(45) Date of Patent: Jan. 26, 2021

(54) WAX-BASED THERMOPLASTIC ORGANIC BINDER COMPOSITION FOR POWDER MOLDING, AND FEEDSTOCK COMPOSITION USING SAME

(71) Applicant: Research Cooperation Foundation of Yeungnam University, Gyeongsan-si (KR)

(72) Inventor: Kwan Hee Han, Gyeongsan-si (KR)

(73) Assignee: Research Cooperation Foundation of Yeungnam University, Gyeongsan-si (KR)

( * ) Notice: Subject to any disclaimer, the term of this patent is extended or adjusted under 35 U.S.C. 154(b) by 239 days.

(21) Appl. No.: 15/774,273

(22) PCT Filed: Nov. 7, 2016

(86) PCT No.: PCT/KR2016/012713
§ 371 (c)(1),
(2) Date: May 7, 2018

(87) PCT Pub. No.: WO2017/082597
PCT Pub. Date: May 18, 2017

(65) Prior Publication Data
US 2018/0327579 A1   Nov. 15, 2018

(30) Foreign Application Priority Data

Nov. 9, 2015   (KR) ........................ 10-2015-0156524

(51) Int. Cl.
*C08L 23/08* (2006.01)
*C08L 91/06* (2006.01)
(Continued)

(52) U.S. Cl.
CPC ........ *C08L 23/0853* (2013.01); *B22F 1/0059* (2013.01); *C08K 3/02* (2013.01);
(Continued)

(58) Field of Classification Search
None
See application file for complete search history.

(56) References Cited

U.S. PATENT DOCUMENTS 2,885,340 A   5/1959   Tench
3,023,156 A   2/1962   Podlipnik
(Continued)

FOREIGN PATENT DOCUMENTS

JP   06-018627 B2   3/1994
JP   2004-232055 A   8/2004
(Continued)

OTHER PUBLICATIONS

Nakagawa et al, JP 2012-021172 A, English Machine Translation from J-PlatPat (Year: 2012).*
(Continued)

*Primary Examiner* — Colin W. Slifka
(74) *Attorney, Agent, or Firm* — Revolution IP, PLLC (57) ABSTRACT

Disclosed is a wax-based thermoplastic organic binder composition consisting of: 50 to 94 wt % of a wax mixture comprising paraffin wax and microcrystalline wax; 3 to 35 wt % of a polyolefin copolymer having a carbonyl group as a backbone polymer; and 3 to 15 wt % of a process control agent.

11 Claims, 3 Drawing Sheets

(51) Int. Cl.

| | |
|---|---|
| *C09J 191/06* | (2006.01) |
| *C08K 3/11* | (2018.01) |
| *B22F 1/00* | (2006.01) |
| *C08K 3/02* | (2006.01) |
| *C08K 7/18* | (2006.01) |
| *B22F 3/10* | (2006.01) |
| *B22F 3/20* | (2006.01) |
| *C22C 1/04* | (2006.01) |
| *B22F 3/11* | (2006.01) |
| *B22F 3/12* | (2006.01) |
| *C08F 10/02* | (2006.01) |
| *C08F 10/06* | (2006.01) |
| *C08K 3/08* | (2006.01) |

(52) U.S. Cl.
CPC .............. *C08K 3/11* (2018.01); *C08K 7/18* (2013.01); *C08L 91/06* (2013.01); *C09J 191/06* (2013.01); *B22F 1/0007* (2013.01); *B22F 3/10* (2013.01); *B22F 3/1121* (2013.01); *B22F 3/12* (2013.01); *B22F 2001/0066* (2013.01); *B22F 2003/208* (2013.01); *B22F 2999/00* (2013.01); *C08F 10/02* (2013.01); *C08F 10/06* (2013.01); *C08F 2500/07* (2013.01); *C08F 2500/12* (2013.01); *C08K 2003/0812* (2013.01); *C08K 2201/003* (2013.01); *C22C 1/0416* (2013.01)

(56) References Cited

U.S. PATENT DOCUMENTS

| | | |
|---|---|---|
| 5,397,531 A | 3/1995 | Peiris et al. |
| 5,951,737 A | 9/1999 | Lefebvre et al. |
| 2012/0031233 A1 | 2/2012 | Lindenau et al. |

FOREIGN PATENT DOCUMENTS

| | | |
|---|---|---|
| JP | 2011-140535 A | 7/2011 |
| JP | 2012-021172 A | 2/2012 |
| KR | 10-0227222 B1 | 11/1999 |

OTHER PUBLICATIONS

International Search Report for PCT/KR2016/012713 dated Feb. 14, 2017 from Korean Intellectual Property Office.

\* cited by examiner

WAX-BASED THERMOPLASTIC ORGANIC BINDER COMPOSITION FOR POWDER MOLDING, AND FEEDSTOCK COMPOSITION USING SAME

TECHNICAL FIELD

The present invention belongs to technical fields of component manufacturing industries, where products having complex shapes are precisely manufactured by low-pressure powder molding such as slurry casting, powder injection molding, micro powder injection molding, or the like, by using a powder material such as a metal or ceramic, and more particularly, relates to an environment-friendly and economical novel organic binder composition blended with a powder material to impart, as a raw component for powder molding, fluidity of powder mixture.

BACKGROUND ART

A feedstock, which is a mixture of metal powder, ceramic powder, or mixed powder thereof, and an organic binder, has been widely used to mold a powder product having a precise and complex shape, by a precise powder molding technology such as slurry casting, powder injection molding, and micro-injection molding.

The slurry casting is a method of forming a shape by pouring a mixture of solid phase powder and organic binder in a slurry state into a mold having a cavity of a desired shape, by its own gravity and hardening the said mixture therein without the aid of external pressure. In powder injection molding or micro-injection molding, a low-pressure powder injection molding can be applied using an injection pressure of about 5 MPa or less. Providing a higher viscosity of the feedstock, the powder injection molding can be performed at a higher molding pressure.

Accordingly, in applying the said low-pressure powder molding, the organic binder plays an important role in a high fluidity feedstock preparation being castable or injectable even at low pressure, wherein the feedstock is kneaded in a molten state with solid powder such as metal powder or ceramic powder.

In the slurry casting, a water-soluble organic binder is mostly used. For low-pressure injection molding, a non-aqueous thermoplastic organic binder composition is used, which is an existing organic binder known for powder injection molding or a modification thereof rather than a one being developed for the purpose. A wax-based thermoplastic organic binder composition useful for powder injection molding is also known.

Generally, a non-aqueous wax-based organic binder is largely composed of: first, a wax component that enables molding; second, a backbone polymer component that exhibits heat resistance at a high temperature and maintains a shape of an injection molded body until sintering is initiated through a debinding process; third, a process control agent such as a surfactant or a lubricant, which combines with the backbone polymer component and imparts adhesion to metal or ceramic powder; and as needed, other additives for improving fluidity or improving strength.

Paraffin wax includes from about 20 to 40 carbon atoms, has a chemical formula of $C_nH_{2n+2}$, and is widely used as a basic component of a thermoplastic organic binder. The paraffin wax has a low melting point of about 46° C. to 60° C. and a high fluidity in a molten state. However, since 80 to 90 wt % of components of the paraffin wax are normal paraffin and are crystallized with large grains, the paraffin wax tends to fracture at room temperature. Further, since the paraffin wax is a non-polar compound, adhesion to a surface of solid-phase powder, such as metal or ceramic powder, is generally poor. For the reason, when mixed with the solid-phase powder, the paraffin wax tends to separate from the solid-phase powder due to a poor dispersibility and fluidity. In this regard, another type of wax having side-branches, a surfactant having a hydroxyl group, a carboxyl group, or an amid group, or a low-molecular weight organic compound having a functional group, such as palm oil or fatty acid, may be added.

It has been known that coating adhesion and strength of a wax mixture are enhanced as a coating material when microcrystalline wax is added (refer to U.S. Pat. Nos. 2,885,340 and 3,023,156). Also, it has been proposed that carnauba wax may be mixed with at least one of vegetable oil or fatty oil to be used as a lubricant (refer to US Patent Publication No. 2012/0031233).

The wax component, the surfactant, or the lubricant described above has been widely used as a lubricant for reducing friction or seizing phenomenon occurring during compaction, by being admixed with metal powder or applied to a mold wall in the conventional powder metallurgy method. In particular, it has been suggested that polyethylene wax, together with synthetic amide wax, may be effectively used for aluminum or an alloy thereof having high tendency to adhere to a mold or a punch during powder molding (U.S. Pat. No. 5,951,737).

However, by using such composition components described above, high fluidity is obtained, but a molded body of metal or ceramic powder, which is produced by being mixed with an organic material, reveals low strength, and in particular, a shape of the molded body is difficult to be maintained during a debinding process where an organic binder is removed, performed after molding. Accordingly, a polymeric material having a higher molecular weight, a higher melting point, and higher strength than wax may be added as a backbone component such that the shape of the molded body debound during a heating process is maintained.

Description of Embodiments

Technical Problem

Provided is an environmentally friendly wax-based thermoplastic organic binder composition that can be suitably used to manufacture a feedstock having high fluidity in a molten state and excellent adhesion to a surface of metal or ceramic powder, thus useful for low-pressure powder molding such as slurry casting, powder injection molding, or micro-powder injection molding, which is performed pressurelessly or at low pressure.

Also, provided is a feedstock having high fluidity useful for a low-pressure powder molding technology, by using the said wax-based thermoplastic organic binder composition.

Solution to Problem

According to an aspect of the present invention, a wax-based thermoplastic organic binder composition consists of: 50 to 94 wt % of a wax mixture including paraffin wax and microcrystalline wax; 3 to 35 wt % of a polyolefin copolymer having a carbonyl group as a backbone polymer; and 3 to 15 wt % of a process control agent.

The wax mixture may consist of 30 to 90 wt % of the paraffin wax and 10 to 70 wt % of the microcrystalline wax.

The backbone polymer may be a maleic anhydride grafted polyolefin copolymer consisting of 0.1 to 50 wt % of maleic anhydride based on 100 wt % of the polyolefin copolymer. The backbone polymer may have room temperature density of 0.9 to 1.10 g/cm$^3$, a Vicat softening temperature of 70 to 125° C., and a melting flow index (190° C. and load of 0.15 kg$_f$) of 5 to 20. The polyolefin may be selected from the group consisting of ethylene vinyl acetate, low density polyethylene, high density polyethylene, and polypropylene copolymer The process control agent may be selected from the group consisting of stearic acid, synthetic amide wax, fatty oil, and polyolefin wax.

The wax-based thermoplastic organic binder composition may additionally consist of, in addition to the polyolefin polymer having the carbonyl group as the backbone polymer, polymer selected from the group consisting of low density polyethylene, high density polyethylene, and polypropylene copolymer.

According to another aspect of the present invention, there is provided a feedstock composition prepared at a temperature of 100 to 180° C. by kneading 10 to 50 vol % of the wax-based thermoplastic organic binder composition based on 100 vol % of the feedstock composition, with metal or alloy powder selected form the group consisting of pure iron, austenitic stainless steel, precipitation-hardenable stainless steel, martensitic stainless steel, maraging steel, heat-resistant steel, high-speed steel, Fe—Si silicon steel, Fe—Si—Al Sendust alloy, Fe—Ni Invar, cobalt-based alloy, nickel-based alloy, Mo—Cu, W—Cu, W—Ni—Cu, W—Ni—Fe, WC—Co superhard alloy, pure copper, Cu—Be, Cu—Al alloy, Cu—Ni—Sn alloy, aluminum, aluminum alloy, magnesium alloy, titanium, and titanium alloy.

The feedstock composition may be metal-based composite powder further including a reinforcing material selected from the group consisting of inorganic powders selected from the group consisting of $Al_2O_3$, SiC, AlN, $B_4C$, $Si_3N_4$, h-BN, c-BN, $MoS_2$, TiC, TiN, and $TiB_2$, short fiber, carbon fiber, graphite flake, carbon nano-tube, diamond, and graphene.

According to another aspect of the present invention, there is provided a feedstock composition including 30 to 50 vol % of the wax-based thermoplastic organic binder composition; and 70 to 50 vol % of composite powder consisting of aluminum powder and at least one selected from the group consisting of inorganic powders selected from $Al_2O_3$, SiC, AlN, $B_4C$, $Si_3N_4$, h-BN, c-BN, $MoS_2$, TiC, TiN, and $TiB_2$, powders selected from polycarbon, graphite flake, carbon nanotube, graphene, and diamond, and inorganic materials in form of short fiber or nanotube. The aluminum powder may be 5 to 40 wt % based on 100 wt % of the composite powder. An average diameter of the aluminum powder may be 0.1 to 20 μm.

Advantageous Effects of Invention

A wax-based thermoplastic organic binder composition according to the present invention uses a polyolefin copolymer having a carbonyl group as a backbone polymer considering adhesion to solid powder, such as metal or ceramic powder, and has excellent fluidity and thus can be effectively used in fields of low-pressure powder molding, such as slurry casting, powder injection molding, micro-injection molding, and the like.

More specifically, the wax-based thermoplastic organic binder composition can be formulated into a feedstock useful for low-pressure powder molding, after being kneaded with metal or alloy powder having a spherical or nearly spherical shape with a particle size of 60 μm or less, more preferably 20 μm or less, and further, the wax-based thermoplastic organic binder composition can be formulated into a composite feedstock useful for low-pressure powder molding by adding a reinforcing material to the metal or alloy powder.

In addition, the wax-based thermoplastic organic binder composition can be suitably modified to have high viscosity or high content of solid powder such as to be effectively used to manufacture a precise component having a complex shape, by applying, to a lightweight metal having low density, powder injection molding using injection pressure of 30 MPa or higher.

Further, when the organic binder composition according to the present invention is kneaded with the metal or alloy powder having the particle size of 60 μm or less at 10 to 30 vol %, the organic binder composition can be suitably used to manufacture a precise product formed of a composite material reinforced with a metal, an alloy, or ceramic, via warm compression or warm extrusion molding under pressure significantly lower than an existing method, and in particular, can be effectively used to manufacture a porous precise-shaped component of a hard material.

BEST MODE

Hereinafter, the present invention will be described in detail.

The present invention provides a wax-based thermoplastic organic binder composition consists of: 50 to 94 wt % of a wax mixture including paraffin wax and microcrystalline wax; 3 to 35 wt % of a polyolefin copolymer having a carbonyl group as a backbone polymer; and 3 to 15 wt % of a process control agent.

Attributes that should be provided, as a thermoplastic organic binder which can be adequately used for low-pressure powder molding such as slurry casting, powder injection molding, micro-injection molding, or the like, are good wettablility of an organic binder for satisfactory dispersion and blending of the organic binder and solid powder such as metal and ceramic powder, good fluidity in a slurry state, and in addition, ability to fill a mold by forming a homogenous flow without separation between the solid powder and the organic binder during a molding operation at low pressure. Inside a resulting molded body prepared as such, providing a uniform distribution of the solid powder is very important in order to prevent a shape distortion which can be occurred due to a locally inhomogeneous densification during a subsequent sintering process.

For the reason, in order for the said low pressure powder molding, fluidity of the organic binder needs to be excellent, and bonding properties between the organic binder and the solid powder such as metal or ceramic powder, needs to be good as well.

In order to obtain the fluidity of the organic binder, the content of wax in the organic binder needs to be high, and it is advantageous to reduce the content of backbone polymer having a relatively high melting point and high molecular weight.

In general, non-polar polyolefin-based polymer has been widely used as a backbone polymer, but in order to improve adhesion to a surface of metal or ceramic powder, a surfactant having a hydroxyl group or a carboxyl group or a synthetic amide-based surfactant was added. In contrast, in the present invention, a polyolefin copolymer having a carbonyl group is used as a backbone polymer in order to impart adhesion property to a polymer, thereby developing an organic binder composition in which adhesion between an organic binder and metal or ceramic powder is improved while fluidity is maintained.

However, when the polyolefin copolymer having a carbonyl group is used as a main ingredient of the backbone polymer as in the present invention, a molded body may excessively adhere to a mold wall during low-pressure powder molding by slurry casting or injection molding, thereby causing the molded body to seize the mold wall during molding. Accordingly, it can be difficult to separate and eject the molded body from the mold after the molding, and in extreme cases, cracks may be formed during a cooling process.

In order to alleviate and resolve such issues, in the present invention, at least one of a lubricant and a surfactant having a low molecular weight may be selected and additionally added. For example, stearic acid having a carboxyl group that has been used in general powder metallurgy fields or ethylene bis-stearamide wax (Acrawax® registered trademark of Lonza, Switzerland or Licowax® registered trademark of Clarient, Swiss) that is synthetic amide wax may be suitably used as the process control agent, or, polyethylene wax (U.S. Pat. No. 5,951,737) or carnauba wax mixed with either vegetable oil or fatty oil (U.S. Patent Publication No. 2012/0031233) may be used as the process control agent.

Further, the organic binder of the present invention having excellent fluidity contains, as a main ingredient, at least 50 wt % of paraffin wax which possesses large solidification contraction and thermal contraction. Thus, the organic binder may exhibit excellent fluidity in a molten state, but is highly likely to crack due to solidification and thermal contraction after being formed into a molded body having a certain shape and then cooled.

Figure 1:
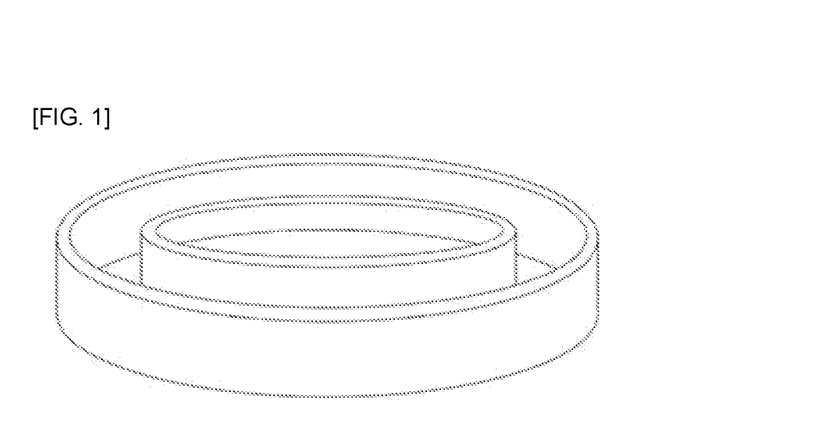
FIG. 1 shows a schematic diagram of a ring mold developed in the present invention to investigate tendency of crack formation during solidification and cooling of an organic binder.

A ring mold test for assessing susceptibility of the organic binder having high fluidity according to the present invention to crack formation has been designed tG for a easily test. This test method uses a ring-shaped metal mold a uniform width, and investigates formation of cracks or tendency for crack formation during solidification and quick cooling of the organic binder after pouring it in a molten state into the metal mold. FIG. 1 shows a schematic diagram of a ring mold designed and used in the present invention.

In order to verify effectiveness of a new binder having high fluidity according to the present invention, a feedstock may be manufactured by using commercial metal powder and commercial metal powder injection molding powder, a molded body may be manufactured by non-pressurized slurry casting, powder injection molding, and warm low-pressure compression molding, and then a high-density sintered body may be manufactured by performing dehydration and sintering processes on the manufactured molded body.

As described above, being used as a main ingredient of a feedstock by kneaded with metal or ceramic powder, paraffin wax has a low melting point, very low viscosity, and excellent fluidity in a molten state, but has weak adhesion to solid powder such as metal or ceramic powder, experiences a large volume contraction during solidification and cooling processes from the molten state, and is brittle at room temperature due to large grains. Thus, in order to overcome shortcomings as such a modification of the paraffin wax is necessary.

According to the present invention, microcrystalline wax may be added to improve the brittleness of paraffin wax, which is a main ingredient of an organic binder forming a molded body. In particular, paraffin wax and microcrystalline wax may be mixed at fractions of 30 to 90 wt % and 10 to 70 wt %, respectively, and for example, 50 to 80 wt % and 20 to 50 wt %, respectively.

The wax-based thermoplastic organic binder composition according to the present invention contains the polyolefin polymer having the carbonyl group as a backbone polymer, wherein the polyolefin copolymer having the carbonyl group improves mechanical properties of a powder molded body, forms a homogeneous flow during molding, maintains a shape of a molded body during a debinding process, and may be added in the range of 3 to 35 wt % based on 100 wt % of the wax-based thermoplastic organic binder composition.

The backbone polymer may be a maleic anhydride grafted polyolefin copolymer having room temperature density of 0.90 to 0.98 g/cm$^3$, a Vicat temperature of 70 to 125° C., and a melt flow index of 5 to 20 (190° C. and a load of 2.15 kg$_f$), and the maleic anhydride grafted polyolefin copolymer may also be a modified copolymer hydrolyzed to have a carboxyl group as in Reaction Scheme 1.

[Reaction Scheme 1]

The content of maleic anhydride in the maleic anhydride grafted polyolefin copolymer may be in the rage of 0.1 to 50 wt % based on 100 wt % of the maleic anhydride grafted polyolefin copolymer.

The wax-based thermoplastic organic binder composition according to the present invention may further contain 0.01 to 20 wt % of a surfactant or lubricant as a process control agent based on 100 wt % of the wax-based thermoplastic organic binder composition to control excessive adhesion to metal and ceramic particles due to the polyolefin copolymer having the carbonyl group. The process control agent may be at least one compound selected from the group consisting of stearic acid, synthetic amide wax, fatty oil, and polyolefin wax.

Further, in order to increase viscosity of the wax-based thermoplastic organic binder composition, at least one of polymer selected from the group consisting of low density polyethylene, high density polymer, and polypropylene copolymer may be added up to 20 wt % to the wax-based thermoplastic organic binder composition, according to the present invention, in addition to the polyolefin copolymer having the carbonyl group as the backbone polymer.

In addition, the present invention provides a feedstock composition prepared at a temperature in the range of 100 to 180° C. by kneading 10 to 50 vol % of the wax-based thermoplastic organic binder composition based on 100 vol % of the feedstock composition, with powder selected form the group consisting of pure iron, austenitic stainless steel, precipitation hardenable stainless steel, martensitic stainless steel, maraging steel, heat-resistant steel, high-speed steel, Fe—Si silicon steel, Fe—Si—Al Sendust alloy, Fe—Ni Invar, cobalt-based alloy, nickel-based alloy, Mo—Cu, W—Cu, W—Ni—Cu, W—Ni—Fe, WC—Co superhard alloy, pure copper, Cu—Be, Cu—Al alloy, Cu—Ni—Sn alloy, aluminum, aluminum alloy, magnesium alloy, titanium, and titanium alloy.

The feedstock composition according to the present invention may be provided as a composite feedstock composition by further containing a reinforcing material selected from the group consisting of inorganic powders selected from the group consisting of $Al_2O_3$, SiC, AlN, $B_4C$, $Si_3N_4$, h-BN, c-BN, $MoS_2$, TiC, TiN, and $TiB_2$, short fiber, carbon fiber, graphite flake, carbon nano-tube, diamond, and graphene.

Further, the feedstock composition according to the present invention may be formulated as a composite feedstock composition by further containing: 30 to 50 vol % of the wax-based thermoplastic organic binder composition; and 70 to 50 vol % of composite powder consisting of aluminum powder and at least one selected from the group consisting of inorganic powders selected from $Al_2O_3$, SiC, AlN, $B_4C$, $Si_3N_4$, h-BN, c-BN, $MoS_2$, TiC, TiN, and $TiB_2$, powders selected from polycarbon, graphite flake, carbon nanotube, graphene, and diamond, and inorganic materials in form of short fiber or nanotube.

The aluminum powder may be contained 5 to 40 wt % based on 100 wt % of the composite powder, wherein an average particle size of the aluminum powder may be 0.1 to 20 μm.

Meanwhile, the wax-based thermoplastic organic binder compound according to the present invention contains simple and environmental-friendly ingredients, but since the organic binder contains a large amount of paraffin wax, the organic binder may experience excessive contraction during a molding process, and thus likely to experience crack formation.

In this regard, the present invention suggests a ring mold test with a constrained geometry so as to simply investigate susceptibility of crack formation. FIG. 1 is a schematic view of a ring mold. The ring mold is formed of AISI 304 austenitic stainless steel, and manufactured to have a groove having an outer diameter of 57 mm, an inner diameter of 37 mm, and a height of 4.85 mm. A large aluminum plate having a thickness of 4 mm is placed at the bottom of the ring mold so that heat is conducted from the ring mold to attain a fast cooling rate of 50° C./min.

According to the ring mold test with a constrained geometry proposed in the present invention, a possible crack formation may be simply and effectively investigated, that could be caused by a shrinkage/contraction during solidification and cooling of the organic binder after melting and pouring into the ring mold, an inhomogeneous shrinkage/contraction along a circumferential direction and a radial direction, and toughness property of the organic binder depending on the degree of crystallinity therein.

Mode of Invention

Examples

A series of tests were performed on various kinds of compositions having different ingredients or ingredient ratios by using ring mold test equipment as suggested by the present invention, and results thereof are shown in Table 1. In Table 1, results of testing organic binder compositions prepared in Examples 1 to 13 and Comparative Examples 1 to 10 are briefly summarized.

TABLE 1

| | Chemical Composition (wt %) | | | | | | | Melting Fluidity (@T° C.) | Crack Formation (Ring Mold Test) | Overall Evaluation |
|---|---|---|---|---|---|---|---|---|---|---|
| | PW | MW | PEW | PE-g-MAH | LDPE | HDPE | Others | | | |
| Example 1 | 70 | 16 | 8 | 6 | — | — | — | High (@140° C.) | No | ◎ |
| Example 2 | 62 | 22 | 6 | 8 | 2 | — | — | High (@145° C.) | No | ◎ |
| Example 3 | 60 | 25 | — | 8 | — | — | 7% SA | High (@145° C.) | No | ◎ |
| Example 4 | 60 | 26 | 6 | 8 | — | — | — | High (@145° C.) | No | ◎ |
| Example 5 | 64 | 22 | — | 8 | — | — | 6% ACRA | High (@145° C.) | No | ◎ |
| Example 6 | 62 | 26 | 6 | 6 | — | — | — | High (@145° C.) | No | ◎ |

TABLE 1-continued

| | Chemical Composition (wt %) | | | | | | | Melting Fluidity (@T° C.) | Crack Formation (Ring Mold Test) | Overall Evaluation |
|---|---|---|---|---|---|---|---|---|---|---|
| | PW | MW | PEW | PE-g-MAH | LDPE | HDPE | Others | | | |
| Example 7 | 45 | 45 | 5 | 5 | — | — | — | High (@140° C.) | No | ○ |
| Example 8 | 72 | 20 | — | 8 | — | — | — | High (@140° C.) | No | ○ |
| Example 9 | 65 | 28 | 4 | 3 | — | — | — | High (@145° C.) | No | ○ |
| Example 10 | 56 | 24 | 10 | 10 | — | — | — | Medium (@145° C.) | No | ○ |
| Example 11 | 60 | 20 | 6 | 14 | — | — | — | Medium (@145° C.) | No | ○ |
| Example 12 | 74 | — | 10 | 16 | — | — | — | Medium (@155° C.) | No | ○ |
| Example 13 | 58 | 16 | 6 | 20 | — | — | — | Medium (@160° C.) | No | ○ |
| Comparative Example 1 | 68 | — | 12 | 22 | — | — | — | Medium (@160° C.) | No | Δ |
| Comparative Example 2 | 92 | — | 5 | 3 | — | — | — | High (@140° C.) | No | Δ |
| Comparative Example 3 | 48 | 48 | 2 | 2 | — | — | — | Medium (@150° C.) | No | Δ |
| Comparative Example 4 | — | 90 | 10 | — | — | — | — | Medium (@150° C.) | Yes | X |
| Comparative Example 5 | 63 | 5 | 5 | 9 | 18 | — | — | Low (@150° C.) | Yes | X |
| Comparative Example 6 | 62 | 20 | 6 | 7 | — | 5 | — | High (@150° C.) | Yes | X |
| Comparative Example 7 | 60 | 19 | 6 | — | 9 | 6 | — | Medium (@150° C.) | Yes | X |
| Comparative Example 8 | 60 | 14 | 6 | 10 | — | 10 | — | Low (@150° C.) | Yes | X |
| Comparative Example 9 | 60 | 20 | 6 | 8 | 6 | — | — | High (@145° C.) | Yes | X |
| Comparative Example 10 | 70 | 20 | — | — | — | — | 10% EVA | High (@150° C.) | Yes | X |

PW: Paraffin Wax,
MW: Microcrystalline Wax,
PEW: Polyethylene Wax,
PE-g-MAH: Maleic Anhydride Grafted Polyethylene,
LDPE: Low Density Polyethylene,
HDPE: High Density Polyethylene,
SA: Stearic acid,
ACRA: Acrawax ® (registered trademark of Lonza),
EVA: Ethylene Vinyl Acetate,
◉: Excellent,
○: Good,
Δ: Normal,
X: Bad Hereinafter, examples and comparative examples will be described in detail with reference to ring mold test results of Table 1.

Example 1

40 g of an organic binder composition was prepared by meting 28 g of paraffin wax (a product of Nippon Seiro Co. Ltd., Japan), 6.4 g of microcrystalline wax (a product of Nippon Seiro Co. Ltd., Japan), 3.2 g of polyethylene wax (a product of Honeywell Corp., U.S.A), and 2.4 g of maleic anhydride grafted polyethylene (a product of Hyundai EP, Korea) at 140° C., the organic binder composition in a molten state was poured into a ring mold, and then a possible crack formation in the said organic mixture molded in the ring mold during rapid solidification and cooling was examined.

Figure 2:
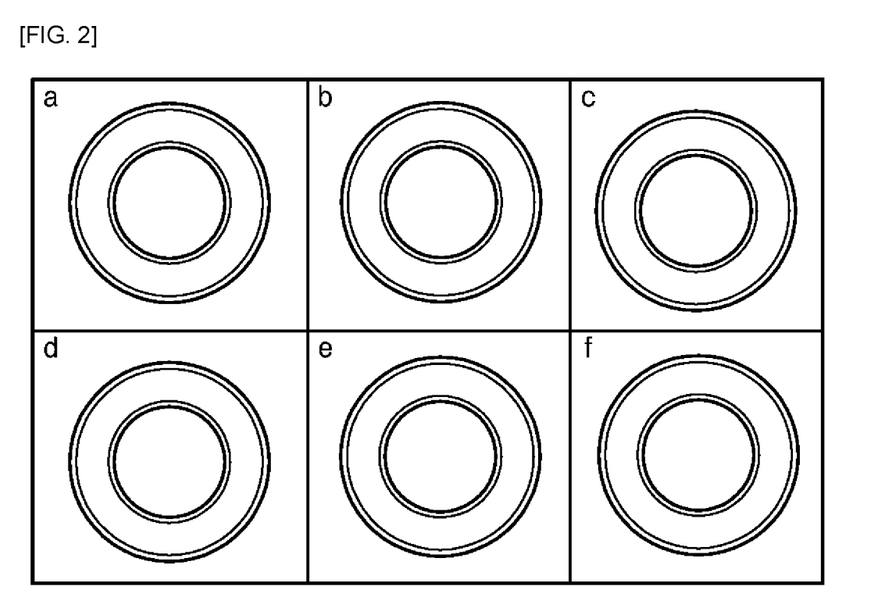
FIG. 2 shows photographs of representative results of ring mold tests for investigating a susceptibility to crack formation during solidification and cooling of an organic binder, wherein (a) is Example 1, (b) is Example 2, (c) is Example 3, (d) is Comparative Example 6, (e) is Comparative Example 7, and (f) is Comparative Example 8.

The organic binder composition of Example 1 had excellent fluidity in the molten state and did not have any thermal crack even in the rapid solidification (FIG. 2 (a)). A plate-shaped specimen having a size of about 33 mm (length)×13 mm (width)×3.5 mm (depth) was prepared by pouring the said organic binder composition into a mold after being melted, and flexural strength measured by the three-point bending test was about 9.4 MPa.

Example 2

40 g of an organic binder composition was prepared by meting and mixing 24.8 g of paraffin wax, 8.8 g of microcrystalline wax, 2.4 g of polyethylene wax, 3.2 g of maleic anhydride grafted polyethylene, and 0.8 g of low density polyethylene at 145° C. The organic binder composition prepared as such had excellent fluidity in a molten state and no thermal crack was observed in the ring mold test proposed by the present invention (FIG. 2 (b)). Also, a specimen was prepared in the same manner as in Example 1, and its flexural strength was determined to be about 11.1 MPa by the three-point bending test.

Example 3

40 g of an organic binder composition was prepared by meting and mixing 24 g of paraffin wax, 10 g of microcrystalline wax, 3.2 g of maleic anhydride grafted polyethylene, and 2.8 g of stearic acid (99.9% purity, Yakuri Pure Chemicals Co., Japan) at 145° C. The organic binder composition prepared as such had excellent fluidity in a molten state and no crack was observed upon examining susceptibility to cracks in the ring mold test proposed by the present invention (FIG. 2 (c)). A specimen was prepared in the same manner as in Example 1, and its flexural strength was determined to be about 10.7 MPa by the three-point bending test.

Example 4

40 g of an organic binder composition was prepared by meting and mixing 24 g of paraffin wax, 10.4 g of microcrystalline wax, 2.4 g of polyethylene wax, and 3.2 g of maleic anhydride grafted polyethylene at 145° C. The organic binder composition prepared as such had excellent fluidity in a molten state and no thermal crack was observed in the ring mold test. Also, a specimen was prepared in the same manner as in Example 1, and its flexural strength was determined to be about 10.3 MPa by the three-point bending test.

Example 5

In a composition similar to Example 1 and Example 2, polyethylene wax was replaced by Acrawax® C. (ACRAWAX® C., a registered trademark of Lonza, Switzerland), wherein 40 g of an organic binder composition was prepared by meting and mixing 25.6 g of paraffin wax, 8.8 g of microcrystalline wax, 3.2 g of maleic anhydride grafted polyethylene, and 2.4 g of Acrawax® C. at 145° C. The organic binder composition prepared as such had excellent fluidity in a molten state and no thermal crack was observed in the ring mold test proposed by the present invention Also, flexural strength was determined to be about 9.8 MPa by the three-point bending test as in Example 1.

Example 6

40 g of an organic binder composition was prepared by meting and mixing 24.8 g of paraffin wax, 10.4 g of microcrystalline wax, 2.4 g of polyethylene wax, 2.4 g of maleic anhydride grafted polyethylene, and 0.8 g of low density polyethylene at 145° C. The organic binder composition prepared as such had excellent fluidity in a molten state and no thermal crack was observed in the ring mold test proposed by the present invention.

Also, a specimen was prepared in the same manner as in Example 1, and its flexural strength was determined to be about 11.3 MPa by the three-point bending test.

Examples 7 to 9

Compositions containing the ingredients of Table 1, i.e., a composition containing 45 wt % paraffin wax, 45 wt % of microcrystalline wax, 5 wt % of polyethylene wax, and 5 wt % of maleic anhydride grafted polyethylene (Example 7), a composition containing 72 wt % of paraffin wax, 20 wt % of microcrystalline wax, and 8 wt % of maleic anhydride grafted polyethylene (Example 8), and a composition containing 65 wt % of paraffin wax, 28 wt % of microcrystalline wax, 4 wt % of polyethylene wax, and 3 wt % of maleic anhydride grafted polyethylene (Example 9), were mixed homogeneously as in Examples 1 to 6, and had excellent fluidity. Also, no apparent cracks were observed during a thermal crack susceptibility test in which the molten compositions were poured into ring molds and quickly cooled. Although the degrees of adhesion property were slightly inferior compared to Examples 1 to 6, the compositions were yet considered to possess a good property as an organic binder for molding alloy powder of a light metal, such as aluminum or magnesium.

Examples 10 to 13

Compositions containing the ingredients of Table 1, i.e., a composition containing 56 wt % paraffin wax, 24 wt % of microcrystalline wax, 10 wt % of polyethylene wax, and 10 wt % of maleic anhydride grafted polyethylene (Example 10), a composition containing 60 wt % of paraffin wax, 20 wt % of microcrystalline wax, 6 wt % of polyethylene wax, and 14 wt % of maleic anhydride grafted polyethylene (Example 11), a composition containing 74 wt % of paraffin wax, 10 wt % of polyethylene wax, and 16 wt % of maleic anhydride grafted polyethylene (Example 12), and a composition containing 58 wt % of paraffin wax, 16 wt % of microcrystalline wax, 6 wt % of polyethylene wax, and 20 wt % of maleic anhydride grafted polyethylene (Example 13), were all transparent liquids in a molten state, and no cracks were observed during a thermal crack susceptibility test in which the melted compositions were poured into ring molds and quickly cooled. Since the amounts of maleic anhydride grafted polyethylene are high, fluidities were slightly inferior compared to Examples 1 to 6, but the compositions were yet determined to possess good adhesive lubricant property useful for powder injection molding, warm powder compression molding, or powder extrusion molding of light alloy.

Comparative Examples 1 to 3

Compositions containing the ingredients of Table 1, i.e., a composition containing 68 wt % paraffin wax, 12 wt % of microcrystalline wax, and 20 wt % of maleic anhydride grafted polyethylene (Comparative Example 1), a composition containing 92 wt % of paraffin wax, 5 wt % of polyethylene wax, and 3 wt % of maleic anhydride grafted polyethylene (Comparative Example 2), and a composition containing 48 wt % of paraffin wax, 48 wt % of microcrystalline wax, 2 wt % of polyethylene wax, and 2 wt % of maleic anhydride grafted polyethylene (Comparative Example 3), were all transparent liquids in a molten state, and no cracks were observed during a thermal crack susceptibility test in which the melted compositions were poured into ring molds and quickly cooled. However, the composition of Comparative Example 1 showed high adhesion but low fluidity, and the compositions of both Comparative Examples 2 and 3 showed high fluidity and low adhesion, and thus the compositions were considered to be inappropriate as an organic binder for slurry casting and low-pressure injection molding.

Comparative Examples 4 to 10

Compositions containing the ingredients of Table 1, i.e., a composition containing 90 wt % of paraffin wax and 10 wt % of polyethylene wax (Comparative Example 4), a composition containing 63 wt % of paraffin wax, 5 wt % of microcrystalline wax, 5 wt % of polyethylene wax, 9 wt % of maleic anhydride grafted polyethylene, and 18 wt % of low density polyethylene (LUTENE MB9500, LG Chemical, Korea) (Comparative Example 5), a composition containing 62 wt % paraffin wax, 20 wt % of microcrystalline wax, 6 wt % of polyethylene wax, 7 wt % maleic anhydride grafted polyethylene, and 5 wt % of high density polyethylene (LUTENE MB9180, LG Chemical, Korea) (Comparative Example 6), a composition containing 60 wt % of paraffin wax, 19 wt % of microcrystalline wax, 6 wt % of polyethylene wax, 9 wt % of low density polyethylene, and 6 wt % of high density polyethylene (Comparative Example 7), a composition containing 60 wt % of paraffin wax, 14 wt % microcrystalline wax, 6 wt % of polyethylene wax, 10 wt % of maleic anhydride grafted polyethylene, and 10 wt % of high density polyethylene (Comparative Example 8), a composition containing 60 wt % of paraffin wax, 20 wt % of microcrystalline wax, 6 wt % of polyethylene wax, 8 wt % of maleic anhydride grafted polyethylene, and 6 wt % of low density polyethylene (Comparative Example 9), a composition containing 70 wt % of paraffin wax, 20 wt % of microcrystalline wax, and 10 wt % of ethylene-vinyl acetate (Comparative Example 10), showed very high fluidity in a molten state, but all showed cracks in the ring mold test of the present invention (FIG. 2 (d): Comparative Example 6, FIG. 2 (e): Comparative Example 7, and FIG. 2 (f): Comparative Example 8).

In order to demonstrate effectiveness of the present invention, among the organic binder compositions of the above examples and comparative examples, application examples of the organic binders which did not show cracks in the ring mold tests, to fabricate molded bodies by slurry casting, low pressure compression molding, or powder injection molding is described, and to manufacture high density sintered body from the molded bodies by debinding and sintering process are described, hereinafter.

Example 14

Figure 3:
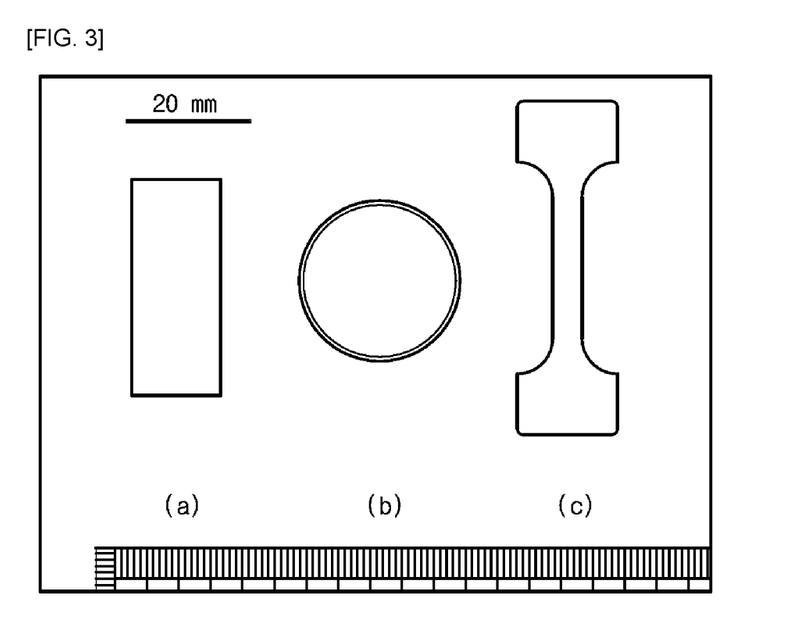
FIG. 3 shows photographs of molded bodies of metal powder manufactured by using an organic binder of the present invention, wherein (a) is a molded copper powder bar manufactured by slurry casting, (b) is a low pressure-molded aluminum powder disc body, and (c) is a 316 L stainless powder molded body manufactured by slurry casting.

A feedstock having a solids loading of 62% was prepared at 145° C. by kneading the organic binder of Example 4 and 138.88 g of spherical copper powder having a particle size of 1 to 5 μm and purity of 99.9% (CU-110, Atlantic Equipment Engineers, U.S.A). The feedstock was reheated to 160° C. to be in a slurry state having high fluidity, cooled to 150° C., poured into a metal mold preheated to 90° C., and then solidified to manufacture a defect-free molded body having a dimension of 14 mm×34 mm×6 mm (FIG. 3 (a)). The molded body had no crack on the surface thereof.

Example 15

A feedstock with a solids loading of 65% was prepared at 140° C. by kneading 99.8% pure spherical aluminum powder having an average particle size of about 6 μm produced via gas atomization (Alpoco, U.K.) and the organic binder of Example 5. The feedstock was crushed into granules having a size about 2 mm or less, charged into a metal mold having an inner diameter of 25.4 mm preheated to 120° C., and molded under pressure of about 1 MPa to manufacture a disc-shaped sound molded body having a height of about 6 mm (FIG. 3 (b)). No crack was observed on the surface of the molded body.

Example 16

A feedstock with a solids loading of 60% was prepared at 140° C. by kneading AISI 316 L powder (a product of Carpenter Technology Corp., U.S.A) having a particle size of −22 μm and the organic binder of Example 3. The feedstock was reheated to 150° C. to be in a slurry state having high fluidity and then poured into a metal mold, preheated to 70° C., for a non-standard tensile test piece having a dimension of 22 mm in parallel section length, 5 mm in parallel section width, and 55 mm in total length, to cast and cool slurry. As such, a molded body of the non-standard tensile test piece without any surface defect and having a thickness of about 6 mm was produced (FIG. 3 (c)).

Example 17

Figure 4:
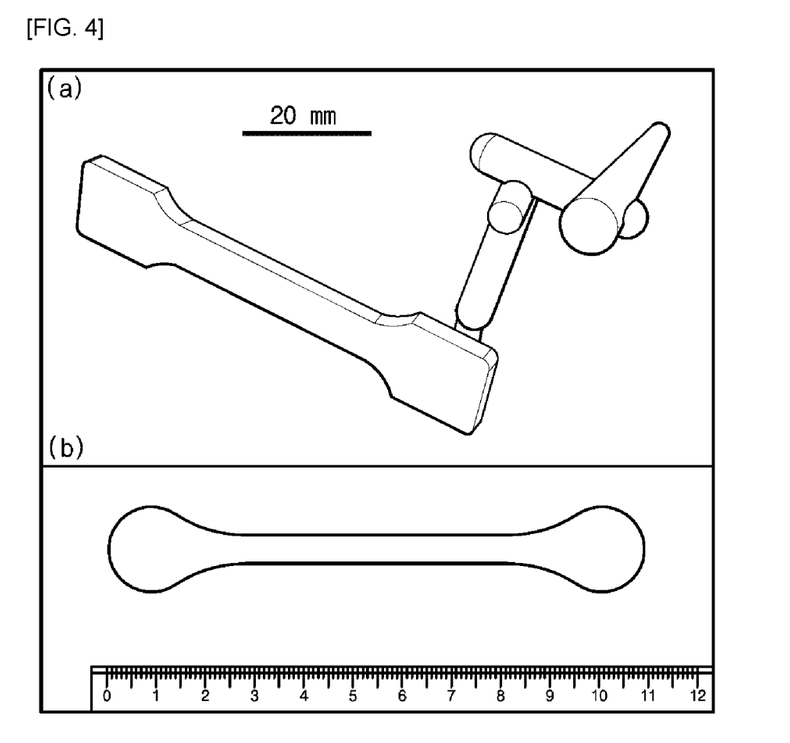
FIG. 4 shows photographs of aluminum powder injection-molded by using an organic binder according to the present invention, wherein (a) illustrates a tensile test piece according to ASTM sub-size standard and (b) illustrates a tensile test piece having a dog-bone shape.

A feedstock with a solids loading of 62% was prepared at 140° C. by kneading 99.5% pure aluminum powder (MEP 105, Ecka Granules, Germany) having an average particle size of about 6 μm with the organic binder of the Example 4. The feedstock was granulated into granules having a size of about 5 mm, and charged into an injection molding machine with clamping force of 80 ton (V330/80 Tech Pro, Angel, Austria). Then, injection was carried out to produce a tensile test piece according to ASTM sub-size standard (ASTEM E8) (FIG. 4 (a)) and a tensile test piece having a dog-bone shape for powder metallurgy (MPIF Standard 50) (FIG. 4 (b)).

Example 18

A feedstock with a solids loading of 65% was prepared at 140° C. by kneading the organic binder of Example 1 with a powder mixture of −22 μm gas-atomized spherical 316L stainless steel powder (a product of Carpenter Steel, U.S.A) and 3 wt % of 99.8% pure $MoS_2$ powder (a product of Atlantic Equipment Engineers, U.S.A). The feedstock was crushed into about 3 mm granules, charged into a mold preheated to 120° C., and then compression-molded under pressure of 3 MPa to produce a disc-shaped molded body having a diameter of 20 mm and a height of 4 mm. The molded body was then put into an alumina tray and charged into a tubular furnace. Under a hydrogen gas flowing at a rate of 0.5 L/min, debinding and sintering were performed in a single process via a single heating schedule: room temperature to 100° C. at 1.5° C./min, hold for 1 hour; 100 to 280° C. at 1.5° C./min, hold for 2.5 hours; 280 to 420° C. at 0.7° C./min, hold for 3.5 hours; 420 to 650° C. at 1.3° C./min, hold for 1 hour; 650 to 1050° C. at 6.7° C./min, hold for 1 hour; 1050 to 1340° C. at 2.5° C./min, hold for 1.5 hours; 1340 to 1100° C. at 4° C./min; and 1100° C. to room temperature, furnace cooling.

Figure 5:
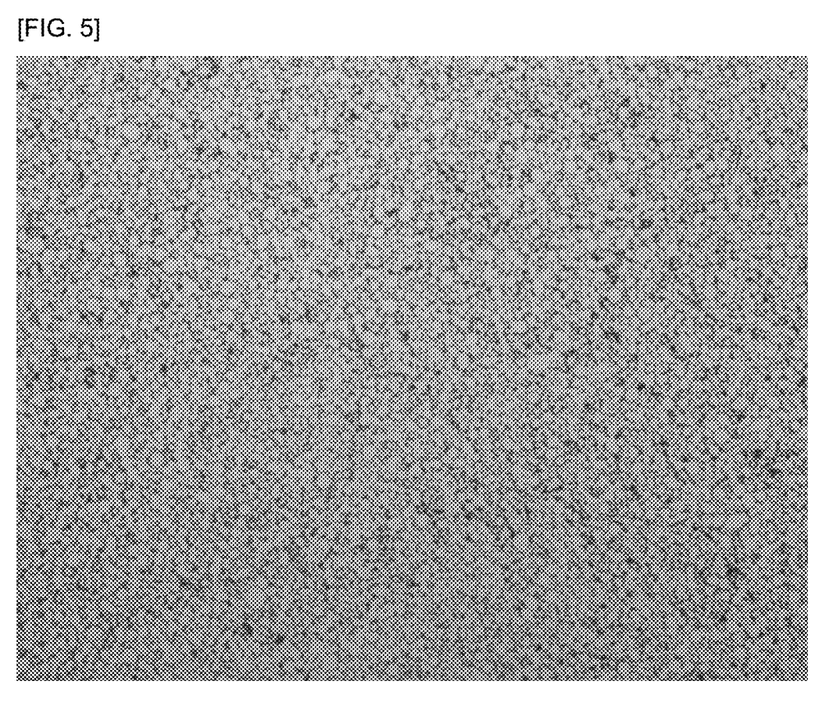
FIG. 5 shows a photographic image of microstructure after sintering of a 316 L stainless steel powder molded body, which is low pressure-molded using an organic binder according to the present invention.

After the sintering, residues retained due to decomposition and degradation of the organic binder were not found, and did not adversely affect a sintered body. Linear shrinkage caused by the sintering of the molded body was observed to be about 13.4% and relative density determined by a method based on principle of Archimedes was about 95.5%. FIG. 5 shows a photographic image of microstructure of the sintered body as observed under an optical microscope.

Example 19

A 50 g feedstock was prepared in small kneader (Rheocord 900, Haake, Germany) by kneading, for 2 hours at 140° C., 40 vol % of the organic binder of Example 3 developed according to the present invention with 60 vol % of composite solid powder including silicon carbide (SiC) powder (Showa Denko K.K., Japan) having an average particle size of about 48 μm and aluminum powder having an average particle size of about 5 μm (MEP 105, Ecka Granules Inc., Germany) at a weight ratio of 4:1 to 9:1. Then, the feedstock for low-pressure molding was crushed into granules having a size of about 2 mm or less. The feedstock prepared as such may be used as a raw material for preparing a silicon carbide porous body.

Figure 6:
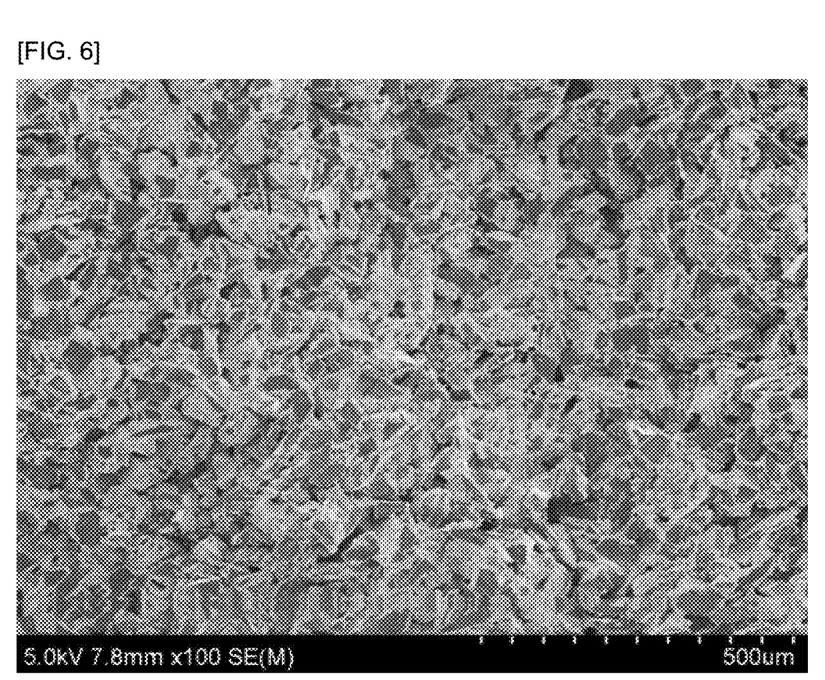
FIG. 6 shows a scanning electron microscope image observed for a sintered body of specimen in which an addition ratio of aluminum powder and silicon carbide powder was 2:8.

3 g of the feedstock was charged to a mold preheated to 120° C. and a disc-shaped molded body having a diameter of 20 mm and a height of 4 mm was prepared by applying low pressure of about 10 MPa. The molded body was then charged into a tube electric furnace, and with a nitrogen gas flowing at a rate of 0.3 L/min, heated according to a following heating schedule: room temperature to 100° C. at 3° C./min, hold for 0.5 hours; 100 to 360° C. at 2.5° C./min, hold for 2 hours; 360 to 520° C. at 0.8° C./min, hold for 3 hours; 520 to 650° C. at 2.5° C./min, hold for 3 hours and then cooling. After about 2 hours at the sintering temperature, occurrence of an exothermic reaction was observed accompanying a rapid increase of a temperature in the furnace. By the x-ray diffraction analysis, it was confirmed that aluminum was fully converted into 2H aluminum nitride (AlN). The observation of a fracture surface of the sintered body prepared as such revealed that silicon carbide body having a uniform porous structure bonded by aluminum nitride was produced. FIG. 6 shows an example of a scanning electron microscope image of a sintered body of specimen in which an addition ratio of aluminum powder and silicon carbide powder was 2:8.

As such, a porous sintered body of silicon carbide bonded by aluminum nitride was manufactured by using a feedstock composition of the present invention.

As described above, the present invention has been described with respect to the examples and drawings, but the present invention is not limited by this, and it is to be understood by one of ordinary skill in the art that various modifications and variations thereof may be possible without departing from the spirit and scope of the invention as set forth in the following claims.

The invention claimed is:

1. A wax-based thermoplastic organic binder composition consisting of:
   50 to 94 wt % of a wax mixture comprising paraffin wax and microcrystalline wax;
   3 to 35 wt % of a polyolefin copolymer having a carbonyl group as a backbone polymer; and
   3 to 15 wt % of a process control agent,
   wherein the backbone polymer is a maleic anhydride grafted polyolefin copolymer consisting of 0.1 to 50 wt % of maleic anhydride based on 100 wt % of the polyolefin copolymer.

2. The wax-based thermoplastic organic binder composition of claim 1, wherein the wax mixture consists of 30 to 90 wt % of the paraffin wax and 10 to 70 wt % of the microcrystalline wax.

3. The wax-based thermoplastic organic binder composition of claim 1, wherein the backbone polymer has room temperature density of 0.9 to 0.98 g/cm$^3$, a Vicat softening temperature of 70 to 125° C., and a melting flow index (190° C. and load of 0.15 kg$_f$) of 5 to 20.

4. The wax-based thermoplastic organic binder composition of claim 3, wherein the polyolefin is selected from the group consisting of ethylene vinyl acetate, low density polyethylene, high density polyethylene, and polypropylene copolymer.

5. The wax-based thermoplastic organic binder composition of claim 1, wherein the process control agent is selected from the group consisting of stearic acid, synthetic amide wax, fatty oil, and polyolefin wax.

6. A feedstock composition prepared at a temperature of 100 to 180° C. by kneading 10 to 50 vol % of the wax-based thermoplastic organic binder composition of claim 1 based on 100 vol % of the feedstock composition, with metal or alloy powder selected form the group consisting of pure iron, austenitic stainless steel, precipitation hardenable stainless steel, martensitic stainless steel, maraging steel, heat-resistant steel, high-speed steel, Fe—Si silicon steel, Fe—Si—Al Sendust alloy, Fe—Ni Invar, cobalt-based alloy, nickel-based alloy, Mo—Cu, W—Cu, W—Ni—Cu, W—Ni—Fe, WC—Co superhard alloy, pure copper, Cu—Be, Cu—Al alloy, Cu—Ni—Sn alloy, aluminum, aluminum alloy, magnesium alloy, titanium, and titanium alloy.

7. The feedstock composition of claim 6, wherein an average diameter of the metal or alloy powder is 0.05 to 60 μm.

8. The feedstock composition of claim 6, being metal-based composite powder further comprising a reinforcing material selected from the group consisting of inorganic powders selected from the group consisting of $Al_2O_3$, SiC, AlN, $B_4C$, $Si_3N_4$, h-BN, c-BN, $MoS_2$, TiC, TiN, and $TiB_2$, short fiber,-carbon fiber, graphite flake, carbon nanotube, diamond, and graphene.

9. A feedstock composition comprising 30 to 50 vol % of the wax-based thermoplastic organic binder composition of claim 1; and 70 to 50 vol % of composite powder consisting of aluminum powder and at least one selected from the group consisting of inorganic powders selected from $Al_2O_3$, SiC, AlN, $B_4C$, $Si_3N_4$, h-BN, c-BN, $MoS_2$, TiC, TiN, and $TiB_2$, powders selected from polycarbon, graphite flake, carbon nanotube, graphene, and diamond, and inorganic materials in form of short fiber or nanotube.

10. The feedstock composition of claim 9, wherein the aluminum powder is 5 to 40 wt % based on 100 wt % of the composite powder.

11. The feedstock composition of claim 9, wherein an average diameter of the aluminum powder is 0.1 to 20 μm.

* * * * *